US010259358B2

(12) United States Patent
Mizobata

(10) Patent No.: US 10,259,358 B2
(45) Date of Patent: Apr. 16, 2019

(54) BACK FRAME ATTACHMENT STRUCTURE AND VEHICLE SEAT

(71) Applicant: TOYOTA BOSHOKU KABUSHIKI KAISHA, Aichi-ken (JP)

(72) Inventor: Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/966,718

(22) Filed: Apr. 30, 2018

(65) Prior Publication Data

US 2018/0339613 A1 Nov. 29, 2018

(30) Foreign Application Priority Data

May 26, 2017 (JP) ................................. 2017-104349

(51) Int. Cl.
*B60N 2/427* (2006.01)
*B60N 2/42* (2006.01)
*B60N 2/68* (2006.01)

(52) U.S. Cl.
CPC ....... *B60N 2/42709* (2013.01); *B60N 2/4228* (2013.01); *B60N 2/42745* (2013.01); *B60N 2/682* (2013.01); *B60N 2/686* (2013.01)

(58) Field of Classification Search
CPC .. B60N 2/682; B60N 2/4228; B60N 2/42709; B60N 2/4221; B60N 2/42754
See application file for complete search history.

(56) References Cited

U.S. PATENT DOCUMENTS

| 3,501,200 | A | * | 3/1970 | Ohta | B60N 2/4228 296/68.1 |
| 6,488,339 | B1 | * | 12/2002 | Finner | B60N 2/682 297/440.1 |
| 10,081,280 | B2 | * | 9/2018 | Furukawa | B60N 2/68 |
| 2005/0140190 | A1 | * | 6/2005 | Kawashima | B60N 2/4228 297/216.14 |
| 2010/0096892 | A1 | * | 4/2010 | Meghira | B60N 2/4214 297/216.14 |

(Continued)

FOREIGN PATENT DOCUMENTS

| DE | 10041655 A1 | * | 3/2002 | ............ B60N 2/22 |
| DE | 102011101700 A1 | * | 6/2012 | ............ B23K 26/24 |

(Continued)

*Primary Examiner* — Timothy J Brindley
(74) *Attorney, Agent, or Firm* — Greenblum & Bernstein, P.L.C.

(57) ABSTRACT

A back frame attachment structure, wherein a back frame includes a pair of side frames, wherein a lower end portion side of the side frame is attached to an upper portion of a lower arm member whose lower portion is fixed to a vehicle body side member, wherein the lower arm member includes two plate-like members superimposed with each other in a seat width direction, the upper portion and the lower portion being connected to each other by a front connection portion and a rear connection portion which are separated by a through-hole, and wherein, when a large load is applied to the back frame, the two plate-like members are configured to absorb energy by being deformed to be separated from each other in the seat width direction by a compressive load in an upper and lower direction generated in the front connection portion or the rear connection portion.

9 Claims, 9 Drawing Sheets

(56) References Cited

U.S. PATENT DOCUMENTS

| | | | |
|---|---|---|---|
| 2010/0176621 A1* | 7/2010 | Aufrere | B60N 2/015 296/68.1 |
| 2010/0187893 A1* | 7/2010 | Yamada | B60N 2/682 297/452.18 |
| 2011/0074189 A1* | 3/2011 | Sawada | B60N 2/20 297/216.1 |
| 2011/0241391 A1* | 10/2011 | Lamparter | B60N 2/24 297/216.1 |
| 2011/0278892 A1* | 11/2011 | Kroener | B23K 20/122 228/112.1 |
| 2015/0202998 A1 | 7/2015 | Komatsubara et al. | |
| 2017/0015220 A1* | 1/2017 | Albert Reginold | B60N 2/682 |
| 2018/0009342 A1* | 1/2018 | Meng | B60N 2/42709 |
| 2018/0215295 A1* | 8/2018 | Onuma | B60N 2/68 |
| 2018/0281633 A1* | 10/2018 | Gabalski | B60N 2/682 |
| 2018/0334065 A1* | 11/2018 | Suzuki | B60N 2/682 |
| 2018/0339621 A1* | 11/2018 | Suzuki | B60N 2/686 |

FOREIGN PATENT DOCUMENTS

| | | | |
|---|---|---|---|
| EP | 0372337 A2 * | 6/1990 | B60N 2/682 |
| JP | 2013-132917 | 7/2013 | |
| JP | 2014054929 A * | 3/2014 | B29C 65/7829 |
| WO | WO-2012013371 A1 * | 2/2012 | B60N 2/42709 |
| WO | WO-2012077444 A1 * | 6/2012 | B60N 2/4228 |
| WO | WO-2013042550 A1 * | 3/2013 | B60N 2/4228 |
| WO | WO-2013072055 A1 * | 5/2013 | B60N 2/68 |
| WO | WO-2015174382 A1 * | 11/2015 | B60N 2/2231 |

* cited by examiner

BACK FRAME ATTACHMENT STRUCTURE AND VEHICLE SEAT

CROSS-REFERENCE TO RELATED APPLICATIONS

This application claims priority from Japanese Patent Application No. 2017-104349 filed on May 26, 2017, the entire contents of which are incorporated herein by reference.

TECHNICAL FIELD

The disclosure relates to a back frame attachment structure of a vehicle seat to be mounted on a vehicle such as an automobile, an airplane, a ship, a train, and a vehicle seat.

BACKGROUND

As a back frame of a vehicle seat, there is one which is attached to a lower arm member, which is attached to a cushion frame, via a recliner so that an inclination angle to the cushion frame can be adjusted. In such a type of a back frame disclosed in JP-A-2011-132917, the back frame is connected, via a recliner, to a rear portion of a lower arm member that is integrated with side frames, which are plate-like members, disposed opposite to each other with a space therebetween on the left and right sides of the cushion frame. An energy absorption part configured by a concave portion formed by recessing part of the plate-like member is formed on the lower member. When a large bending load is applied to the back frame due to rear collision or the like of a vehicle, the energy absorption part is deformed to absorb the energy generated by the rear collision or the like.

In the above-described structure, the lower arm member is a single plate-like member, and an energy absorption part configured by a concave portion is formed on a part of the lower arm member. In this way, when a large bending load is applied to the back frame due to rear collision or the like of a vehicle, there is a possibility that the lower arm member is deformed and falls down not only in an upper and lower direction but also in a seat width direction. When the lower arm member is deformed so as to fall down in the seat width direction, the back frame also moves so as to fail down in the seat width direction, and the supporting performance for a seated occupant is deteriorated. Therefore, in order to deform the lower arm member in the upper and lower direction in a well-balanced manner at the time of fear collision of a vehicle, trial and errors are required to optimize the structure of the lower arm member and the shape of the energy absorption part or the like.

The disclosure aims to provide a back frame attachment structure of a vehicle seat, which is capable of absorbing energy at the time of rear collision or the like of a vehicle by suppressing, deformation in the seat width direction. of the lower arm member with a simple structure, and a vehicle seat.

According to an aspect of the disclosure, there is provided a back frame attachment structure of attaching a hack frame of a vehicle seat to a vehicle body side member, wherein the back frame includes a pair of side frames extending in an upper and lower direction with a space in a seat width direction, wherein a lower end portion side of at least one of the pair of side frames is attached to an upper portion of a lower arm member whose lower portion is fixed to the vehicle body side member, wherein the lower arm member includes two plate-like members which are superimposed with each other in the seat width direction, the upper portion of the lower arm member and the lower portion of the lower arm member being connected to each other by a front connection portion located on a front side and a rear connection portion located on a rear side, and the front connection portion and the rear connection portion being separated by a through-hole located at a middle of the lower arm member when viewed from the seat width direction, and wherein, when a large load due to collision or the like of a vehicle is applied to the back frame, the two plate-like members are configured to absorb energy by being deformed to be separated from each other in the seat width direction by a compressive load in the upper and lower direction generated in the front connection portion or the rear connection portion.

Accordingly, when large load due to collision or the like of the vehicle is applied to the back frame, a strong compressive load in the upper and lower direction is generated in tire rear connection portion at the time of rear collision and is generated in the front connection portion at the time of front collision. At this time, since the rear connection portion and front connection portion are formed by superimposing the two plate-like members in the seat width direction, the two plate-like members are respectively buckled so as to be separated from each other in the seat width direction, thereby absorbing energy. In this way, the rear connection portion and the front connection portion are easily deformable in the upper and lower direction and are difficult to fall down in the seat width direction, so that the deformation in the left and right direction of the lower arm member can be suppressed by a simple structure in either case of front collision or rear collision.

According to another aspect of the disclosure, there is provided a vehicle seat including: a back frame including a pair of side frames extending in an upper and lower direction with a space in a seat width direction; a lower arm member including two plate-like members which are superimposed with each other in the seat width direction, an upper portion of the lower Linn member being connected to at least one of the pair of side frames; and a cushion frame to which a lower portion of the lower arm member is fixed, wherein the upper portion of the lower arm member and the lower portion of the lower arm member are connected to each other by a front connection portion located on a front side and a rear connection portion located on a rear side, the front connection portion and the rear connection portion being separated by a through-hole located therebetween, and wherein at least one of the front connection portion and the rear connection portion includes a deformation promoting portion configured to promote deformation of the two plate-like members in a direction separated from each other.

DETAILED DESCRIPTION

FIGS. 1 to 6 show an embodiment of the disclosure. This embodiment represents an example in which the disclosure is applied to a seat frame of an automobile seat that is one of vehicle seats. In each drawing, respective directions of an automobile and an automobile seat in a state where the automobile seat including a seat frame is mounted on a floor of the automobile are indicated by arrows. In the following, the descriptions relating to the directions will be made on the basis of these directions.

Figure 1:
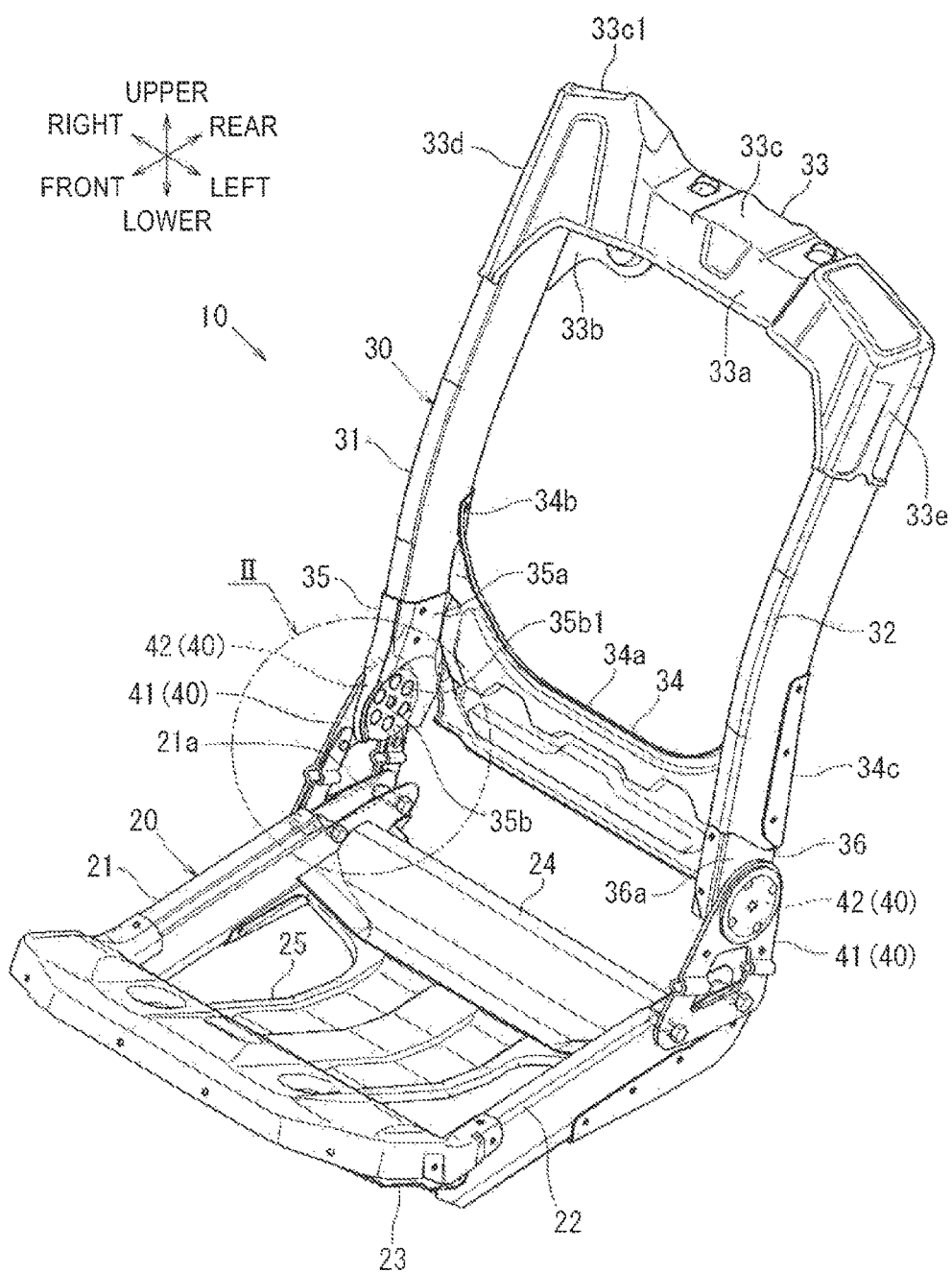
FIG. 1 is a perspective view of a seat frame of an automobile seat to which a back frame attachment structure according to an embodiment of the disclosure is applied

As shown in FIG. 1, a seat frame 10 of this embodiment is a seat frame of a right automobile seat with a built-in seatbelt. A webbing take-up device (not shown) of a seatbelt device can be attached to the seat frame 10. The seat frame 10 includes a cushion frame 20 configured to support the buttock and thigh of a seated occupant, a back frame 30 configured to support the back of the seated occupant, and a connection member 40 configured to connect the back frame 30 to the cushion frame 20. Here, the cushion frame 20 corresponds to the "vehicle body side member" in the claims.

As shown in FIG. 1, the cushion frame 20 includes a right side frame 21 and a left side frame 22 extending in a front and rear direction on both sides in a seat width direction, front frame 23, a rear frame 24 and a panel member 25. Here, the right side frame 21 and the left side frame 22 correspond to "a pair of side frames" in the claims.

The right side frame 21 and the left side frame 22 are made of an extruded material of an aluminum alloy having a substantially rectangular cross section as a base. Front end portions of the right side frame 21 and the left side frame 22 are connected in a bridging manner by the trout frame 23 that is made of an extruded material of an aluminum alloy having a predetermined cross-sectional shape as a base. Further, rear end portions of the right side frame 21 and the left side frame 22 are connected in a bridging manner by the rear frame 24 that is made of an extruded material of an aluminum alloy having a predetermined cross-sectional shape as a base. The panel member 25 is a carbon fiber reinforced composite resin molded product obtained by curing a plurality of laminated carbon fiber fabrics with matrix resin of epoxy resin. The panel member 25 has a substantially H-like shape in which a central portion in the front and rear direction is constricted in the seat width direction in a top view. The panel member 25 has a front end portion attached to an upper side of the front frame 23 and a rear end portion attached to it lower side of the rear frame 24. A cushion pad (not shown) that is a cushion material is placed and supported on an upper surface of the panel member 25.

Figure 2:
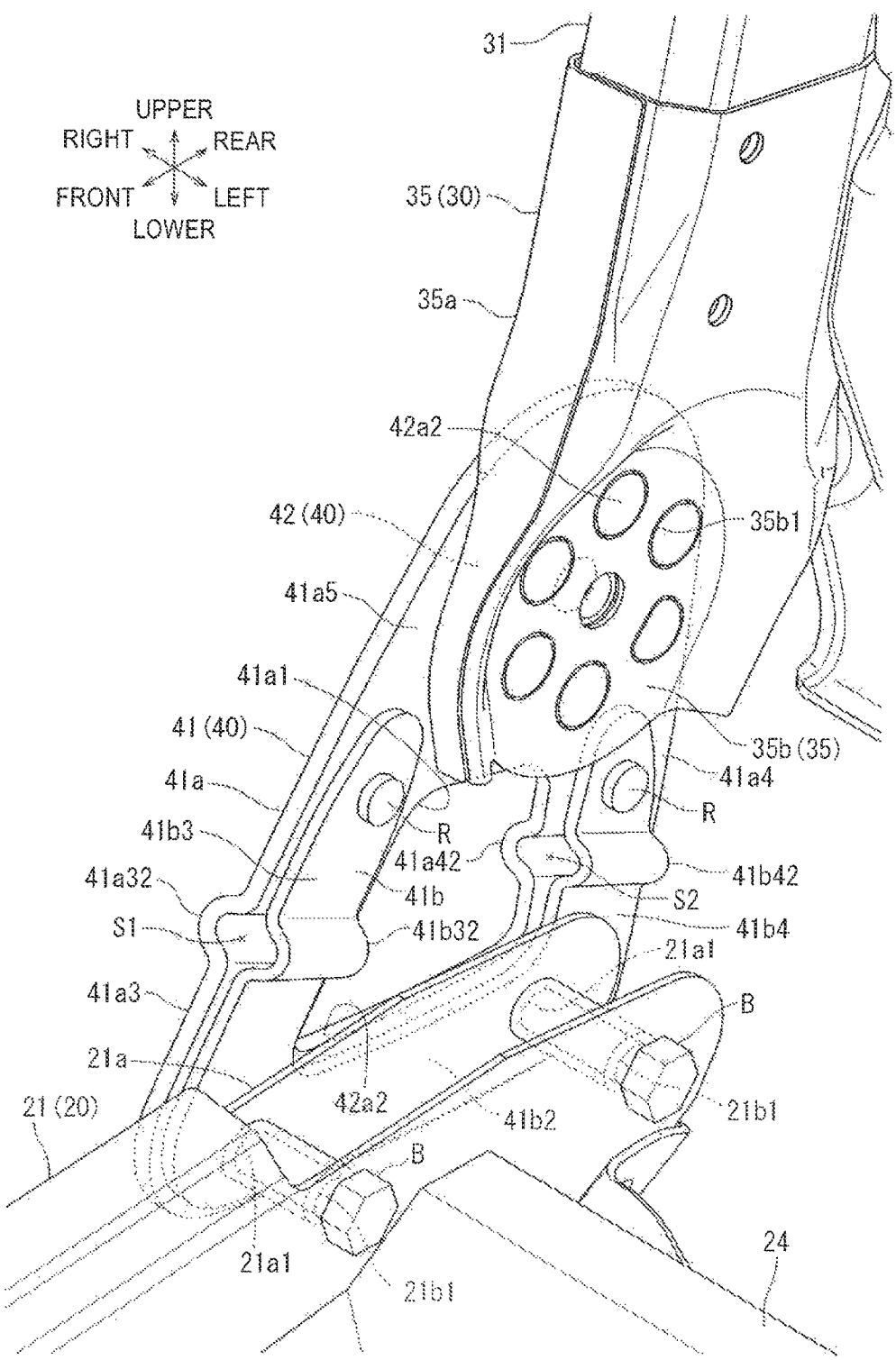
FIG. 2 is an enlarged perspective view showing the II portion in FIG. 1.

At the rear upper portions of the right side frame 21 and the left side frame 22, notches for attaching lower arms 41 (to be described later) are provided. Since the notches on the left and right sides are symmetrical with respect to a plane passing through a center line in the seat width direction and perpendicular to a horizontal plane, the right notch will be described as a representative. As shown in FIGS. 1 and 2, the rear upper portion of the right side frame 21 is cut out to form a notch 21a. On a left surface portion and a right surface portion of the right side frame 21 corresponding to the notch 21a, a bolt hole 21a1 and a bolt hole 21b1 penetrating in the left and right direction and aligned in the front and rear direction are provided. A bolt B is passed through the bolt hole 21a1 and the bolt hole 21b1, and a lower end portion of the lower arm 41 (to be described later) is fastened and fixed to the right surface portion.

As shown in FIG. 1, the back frame 30 includes a right side frame 31 and a left side frame 32 extending in an upper and lower direction on both sides in the seat width direction, an upper frame 33, a lower frame 34, a right upper arm 35, and a left upper arm 36. The right side frame 31 is made of an extruded material of an aluminum alloy having the same sectional shape as the right side frame 21 and the left side frame 22 of the cushion frame 20 as a base. The right side frame 31 is formed by being bent so as to have a convex shape toward the front in the vicinity of the central portion in the upper and lower direction. The left side frame 32 is also made of an extruded material of an aluminum alloy having the same sectional shape as the right side frame 21 and the left side frame 22 of the cushion triune 20 as a base. The left side frame 32 is also formed by being bent so as to have a convex shape toward the front in the vicinity of the central portion in the upper and lower direction. The right upper arm 35 that is a press part made of non IS attached to a lower end portion side of the right side frame 31. The right upper arm 35 is a part formed as a single part by combining two parts in a state of facing each other. An upper portion of the right upper arm 35 is formed as a side frame connecting portion 35a so that internal line of the horizontal section corresponds to an external line of the cross sectional shape of the right side frame 31. Further, a lower portion of the right upper arm 35 is formed as a flat plate-like recliner connecting portion 35b and is provided with a recliner connecting hole 35b1. In a state where a lower end portion side of the right side frame 31 inserted into the side frame connecting portion 35a of the right upper arm 35, the right side frame 31 is connected to the right upper arm 35 by being fastened with a rivet (not shown). The left upper arm 36 that is a press part made of iron is attached to a lower end portion side of the left side frame 32. The left upper arm 36 is a plate-like press molded part. An upper portion of the left upper arm 36 is formed as a side frame connecting portion 36a so as to correspond to the front side, the left side and the rear side in the external line of the cross-sectional shape of the left side frame 32. Further, a lower portion of the left upper arm 36 is formed as a flat plate-like recliner connecting portion (not shown). In a state where the side frame connecting portion 36a of the left upper arm 36 is in contact with a lower end portion side of the left side frame 32, the left upper arm 36 is connected by being fastened with a rivet (not shown).

As shown in FIG. 1, the upper frame 33 is a member having a substantially inverted U-shaped cross section opened downward. The upper flame 33 is a carbon fiber reinforced composite resin molded product obtained by curing a plurality of laminated carbon fiber fabrics with matrix resin of epoxy resin. The upper frame 33 has a front wall portion 33a, a rear wall portion 33b, an upper wall portion 33c, a right wall portion 33d, and a left wall portion 33e. A belt guide portion 33c1 is provided on a right end portion side of the upper wall portion 33c. The belt guide portion 33c1 functions to guide a webbing (not shown) of a seatbelt device released from a webbing take-up device (not shown) disposed inside a seat back from a back surface of the back frame 30 toward a front surface of an upper body or a seated occupant. When the upper flame 33 is put on the upper end portions of the right side frame 31 and the left side frame 32 from above, a left surface of the right wall portion 33*d* is formed to be in contact with a right surface of the right side frame 31. Further, when the upper frame 33 is put on the upper end portions of the right frame 31 and the left side frame 32 from above, a right surface of the left wall portion 33*e* is formed to be in contact with a left surface of the left side frame 32.

As shown in FIG. 1, the lower frame 34 has a substantially U shape in a front view and is a carbon fiber reinforced composite resin molded product obtained by curing a plurality of laminated carbon fiber fabrics with matrix resin or epoxy resin. The lower frame 34 has a main portion 34*a*, a right connection portion 34*b* that is a connection portion with a lower end portion side of the right side frame 31, and a left connection portion 34*c* that is a connection portion with a lower end portion side of the left side frame 32. The right connection portion 34*b* is formed to be finable to a lower end portion side the right side frame 31 from behind. In a state where the right connection portion 34*b* is fitted to the right side frame 31, the lower frame 34 is connected to the right side frame 31 by being fastened with a rivet (not shown). The left connection portion 34*c* is formed to be fittable to a lower end portion side of the left side frame 32 from behind. In a state where the left connection portion 34*c* is fitted to the left side frame 32, the lower frame 34 is connected to the left side frame 32 by being fastened with a rivet (not shown).

Figure 4:
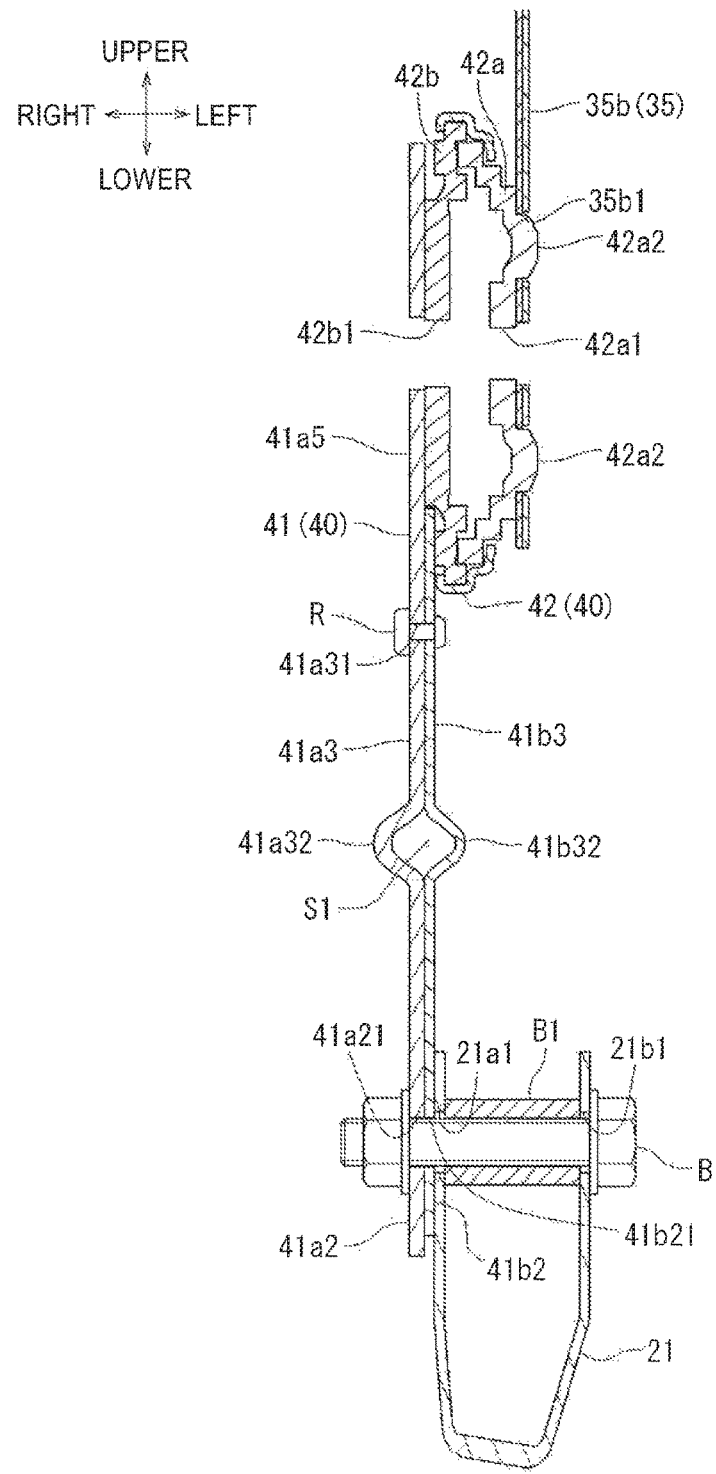
FIG. 4 is a sectional view taken along the line IV-IV in FIG. 3.

As shown in FIG. 1, the connection member 40 includes the lower arm 41 whose lower end portion side is attached to the cushion frame 20, and a recliner 42 attached to an upper end portion side of the lower arm 41. Prior to the description of the lower arm 41, the recliner 42 will be described. As shown in FIG. 4, the recliner 42 is configured by assembling an external teeth member having an external gear and an internal teeth member having an internal gear. Further, when an operation shaft (not shown) is rotated, the external gear revolves while changing its meshing position with respect to the internal gear. By stopping the rotation of the operation shaft, the recliner 42 is pressed in a direction in which both gears are meshed with each other by a pressing member provided between the external gear and the internal gear. In this way, the recliner 42 is Field in a state where its rotation is stopped. Since a basic configuration of the recliner 42 is disclosed in the literature such as JP-A-2008-18055, the detailed description thereof is omitted. An operation shaft hole 42*a*1 through which the operation shaft passes is provided in an inner plate 42*a* that is the internal teeth member of the recliner 42. On the circumference of a predetermined radius from the center of the operation shaft hole 42*a*1, six cylindrical protrusions 42*a*2 extend in the left direction that is the direction of the right upper arm 35 and are arranged at regular intervals. The six cylindrical protrusions 42*a*2 is attached by being engaged with the six recliner connecting holes 35*b*1 provided in the right upper arm 35. An operation shaft hole 42*b*1 through which the operation shaft passes is provided in an outer plate 42*b* that is the external teeth member of the recliner 42. On the circumference of a predetermined radius from the center of the operation shall hole 42*b*1, six cylindrical protrusions (not shown) extend in the right direction that is opposite to tire right upper arm 35 and are arranged at regular intervals. The six cylindrical protrusions are attached by being engaged with six engagement holes (not shown) provided in the lower arm 41. Here, the lower arm I corresponds to the "lower arm member" in the claims.

Figure 3:
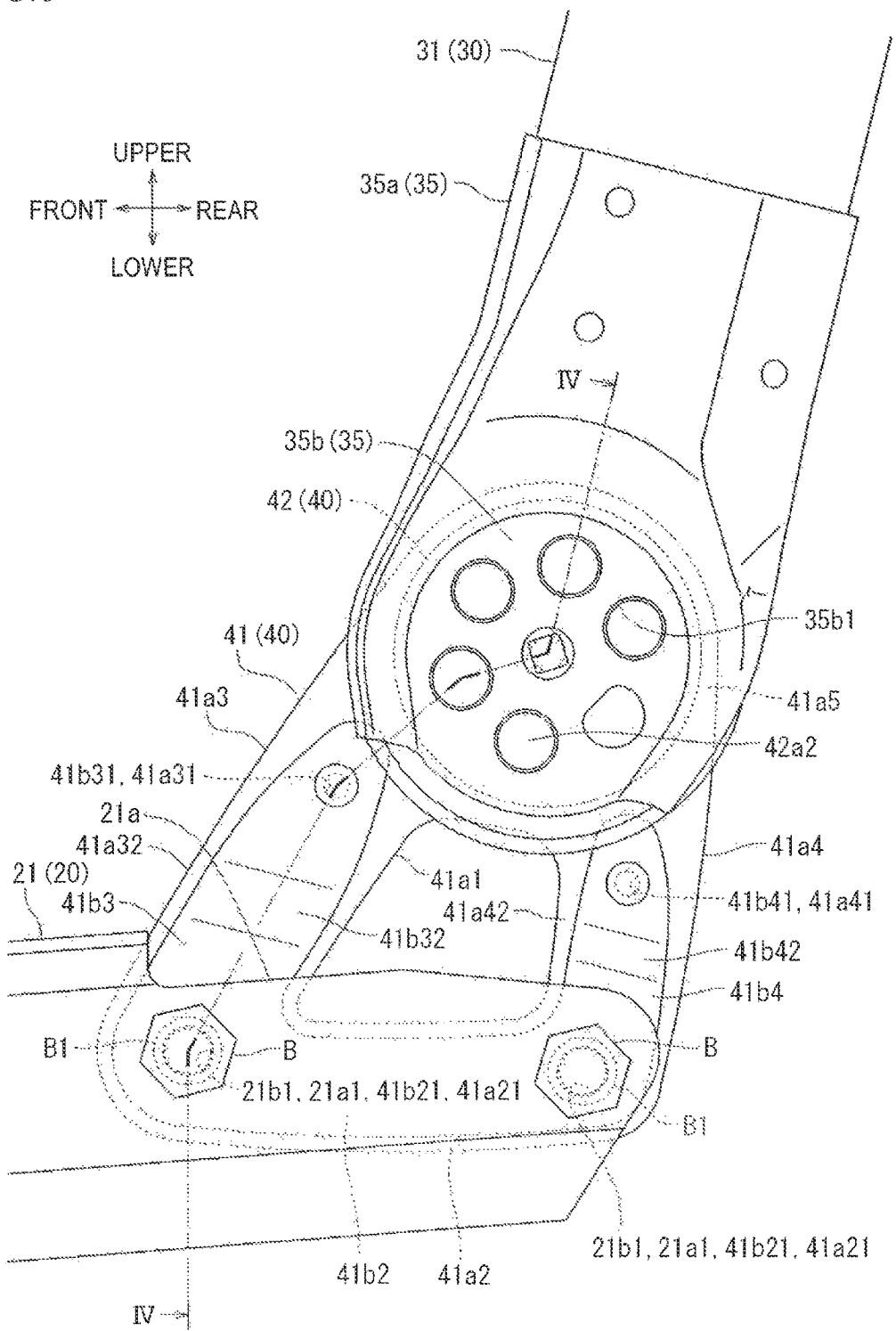
FIG. 3 is a side view of the portion shown in FIG. 2 as seen from the inside of the seat, from which a rear frame and a panel member are omitted.

As shown in FIGS. 2 to 4, the lower arm 41 is a plate-like member made of a thick steel plate. Since the left and right lower arms 41 are symmetrical with respect to a plane passing through a center line in the seat width direction and perpendicular to a horizontal plane, the right lower arm 41 will be described as a representative. As shown in FIGS. 2 to 4, the lower arm 41 is formed by superimposing a substantially triangular outer arm 41*a* having a through-hole 41*a*1 at a middle when viewed from the seat width direction and having its lower side as the bottom side and a substantially U-shaped inner arm 41*b* opened upward as seen from the seat width direction. The outer arm 41*a* is thicker than the inner arm 41*b*. Here, the outer arm 41*a* and the inner arm 41*b* correspond to the "plate-like member" in the claims, respectively.

As shown in FIGS. 2 to 4, the outer arm 41*a* has a bottom side portion 41*a*2 gat the lower portion of the substantially trapezoidal through-hole 41*a*1, a front arm portion 41*a*3 at the front portion, a rear arm portion 41*a*4 at the rear portion, and a recliner attaching portion 41*a*5 at the upper portion, as seen from the left and right direction. Bolt holes 41*a*21 for fastening and fixing the outer arm 41 a to the right side frame 31 through the bolts B are provided on the front end portion side and the rear end portion side of the bottom side portion 41*a*2, respectively. The length in the front and rear direction of the front arm portion 41*a*3 is longer than that of the rear arm portion 41*a*4. This is to withstand a downward compressive load applied from the right side frame 31 via the recliner 42 by a large forward tensile load applied to the belt guide portion 33*c*1 of the back frame 30 from the webbing of the seatbelt at the time of the front collision of the automobile. A rivet hole 41*a*31 for fastening with the inner arm 41*b* by a rivet R is provided in the upper end portion side of the front arm portion 41*a*3. Further, a ridge 41*a*32 protruding to the right and extending substantially in the left and right direction is formed substantially at the middle of the front arm portion 41*a*3 between the rivet hole 41*a*31 and the front bolt hole 41*a*21. When a compressive load in the upper and lower direction is applied to the front arm portion 41*a*3, the ridge 41*a*32 gives a trigger for the buckling of the front arm portion 41*a*3 to the right side. A rivet hole 41*a*41 for fastening with the inner arm 41*b* the rivet R is provided in the upper end portion side of the rear arm portion 41*a*4. Further, a ridge 41*a*42 protruding to the right and extending substantially in the front and rear direction is formed substantially at the middle of the rear arm portion 41*a*4 between the rivet hole 41*a*41 and the rear bolt hole 41*a*21. When a compressive load in the upper and lower direction is applied to the rear arm portion 41*a*4, the ridge 41*a*42 gives a trigger for the buckling at the rear arm portion 41*a*4 to the right side. Six engagement hoes (not shown) penetrating in the left and right direction are provided in the recliner attaching portion 41*a*5 so as to correspond to six protrusions (not shown) for fixing the outer plate 42*b* of the recliner 42. Here, the front arm portion 41*a*3 and the rear arm portion 41*a*4 correspond to the "front connection portion" and the "rear connection portion" in the claims, respectively. Further, the ridge 41*a*32 and the ridge 41*a*42 correspond to the "deformation promoting portion and protruding portion" in the claims, respectively Furthermore, the bottom side portion 41*a*2 and the recliner attaching portion 41*a*5 correspond to the "lower portion" and the "upper portion" in the claims, respectively.

As shown in FIGS. 2 to 4, the inner arm 41*b* has a bottom side portion 41*b*2 at the lower portion, a front arm portion 41*b*3 at the front portion, and a rear arm portion 41*b*4 at the rear portion, as seen from the left and right direction. Bolt holes 41b21 for fastening and fixing the inner arm 41b to the right side frame 31 through the bolts B are provided. on the front end portion side and the rear end portion side of the bottom side portion 41b2, respectively. The length in the front and rear direction of the front arm portion 41b3 is shorter than that of the front arm portion 41a3 of the outer arm 41a and longer than that of the rear arm portion 41b4. This is also to withstand a downward compressive load applied from the right side frame 31 via the recliner 42 by a large forward tensile load applied to the belt guide portion 33c1 of the back frame 30 from the webbing of the seatbelt at the time of the front collision of the automobile. Further, the length in the upper and lower direction of the front arm portion 41b3 is longer than that of the rear arm portion 41b4. The upper end portion side of the front arm portion 41b3 is formed such that the length in the front and rear direction gradually becomes shorter upward. A rivet hole 41b31 for fastening with the outer arm 41a by the rivet R is provided in the upper end portion side of the front arm portion 41b3. Further, a ridge 41b32 protruding to the left and extending substantially in the left and right direction is formed substantially at the middle of the front arm portion 41b3 between the rivet hole 41b31 and the front bolt hole 41b21. When a compressive load in the upper and lower direction is applied to the front arm portion 41b3, the ridge 41b32 gives a trigger for the buckling of the front arm portion 41b3 to the left side. When the inner arm 41b is attached to the outer arm 41a, the ridge 41b32 and the ridge 41a32 face each other to form a gap S1 extending substantially in the from and rear direction therebetween. The length in the front and rear direction of the rear nun portion 41b4 is shorter than that or the rear arm portion 41a4 of the outer arm 41a. The upper end portion side of the rear arm portion 41b4 is formed such that the length in the front and rear direction gradually becomes shorter upward. A rivet hole 41b41 for fastening with the outer arm 41a by the rivet R is provided in the upper end portion side of the rear arm portion 41b4. Further, a ridge 41b42 protruding to the left and extending substantially in the front and. rear direction is formed substantially at the middle of the rear arm portion 41b4 between the rivet hole 41b41 and the rear bolt hole 41b21. When a compressive load in the upper and lower direction is applied to the rear arm portion 41b4, the ridge 41b42 gives a trigger for the buckling of the rear arm portion 41b4 to the left side. When the inner arm 41b is attached to the outer arm 41a, the ridge 41b42 and the ridge 41a42 face each other to form a gap 52 extending substantially in the front and rear direction therebetween. Here, the front arm portion 41b3 and the rear arm portion 41b4 correspond to the "front connection portion" and the "rear connection portion" in the claims, respectively. Further, the ridge 41b32 and the ridge 41b42 correspond to the "deformation promoting portion and protruding portion" in the claims, respectively. Furthermore, the bottom side portion 41b2 corresponds to the "lower portion" in the claims.

As shown in FIGS. 2 to 4, the inner plate 42a of the recliner 42 is connected, by welding, to the recliner connecting portion 35b of the right upper arm 35 of the back frame 30 assembled in advance. Then, the recliner attaching portion 41a5 of the outer arm 41a in a state where the inner arm 41b is previously fastened and fixed by the rivet Si is connected to the outer plate 42b of the recliner 42 by welding. In this state, the left surface of the bottom side portion 41b2 of the inner arm 41b is brought into contact with the right surface on the rear end portion side of the right side frame 21. The front bolt hole 41a21, the from bolt hole 41b21, the front bolt hole 21a1 and the front bolt hole 21b1 are aligned and the bolt B is passed through these bolt holes to connect the right side frame 21 and the lower arm 41. Similarly, the rear bolt hole 41a21, the rear bolt hole 41b21, the rear bolt hole 21a 1 and the rear bolt hole 21b1 are aligned and the bolt B is passed through these holes to connect the right side frame 21 and the lower arm 41. At this time, a spacer B1 is disposed between the front bolt hole 21a1 and the front bolt hole 21b1 and between the rear bolt hole 21a1 and the rear boll hole 21b1, respectively. Since the left and right configurations are substantially symmetrical with respect to a plane passing through a center line in the seat width direction and perpendicular to the horizontal plane, the description for the attaching of the left connection member 40 to the left upper arm 36 of the back frame 30 and the attaching of the left connection member 40 to the left side frame 22 is omitted. In this way, the back frame 30 is attached to the cushion frame 20 so that its inclination angle can be adjusted.

Figure 5:
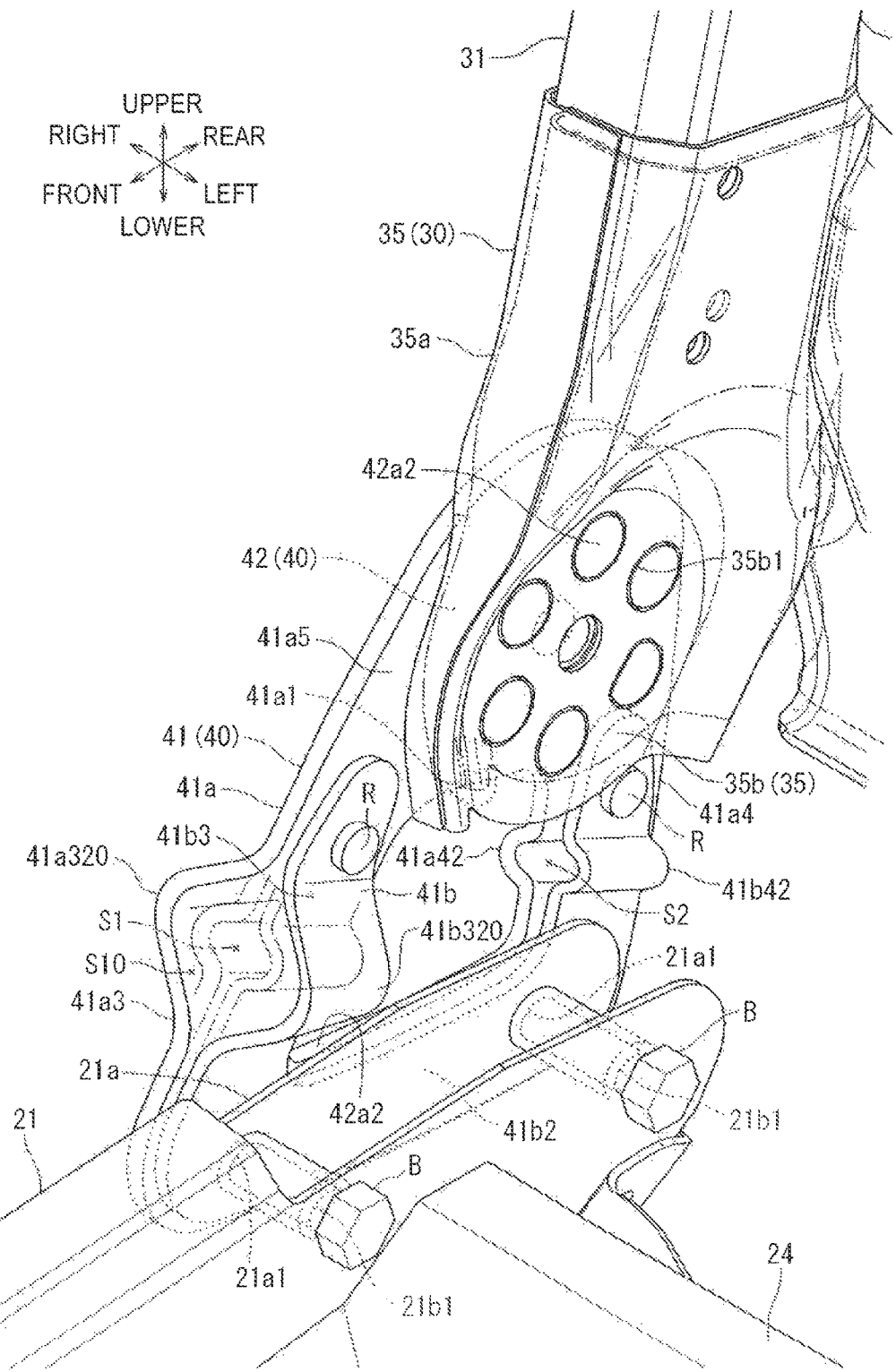
FIG. 5 is a perspective view showing a state after a lower arm is deformed in FIG. 2.
Figure 6:
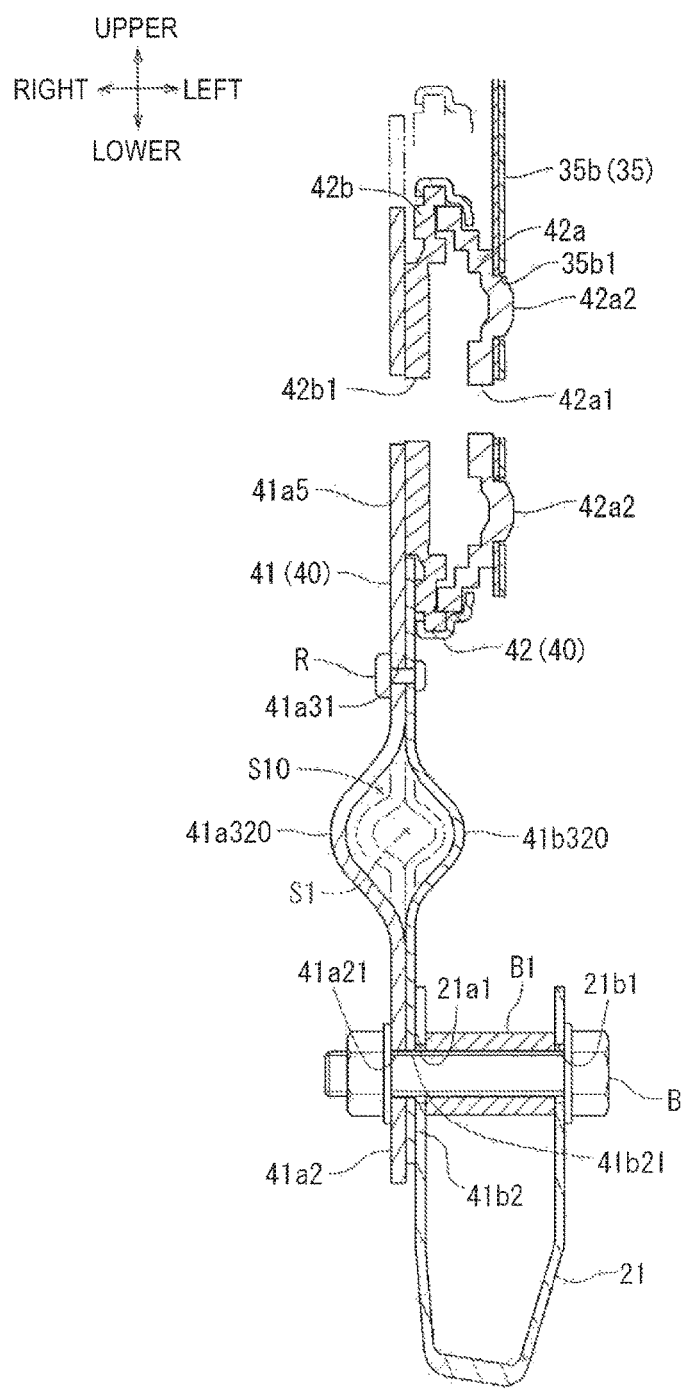
FIG. 6 is a sectional view showing a state after the lower arm is deformed in FIG. 4.

Operational effects of the present embodiment will be described with reference to FIGS. 5 and 6. A pre-deformation initial state is indicated by a two-dot chain line, and a post-deformation state after a large bending load is applied from the right side frame 31 via the recliner 42 at the time of the front collision of the automobile is indicated by a solid line. In FIG. 5, when a large tensile load in the forward direction is applied to the upper end portion of the right side frame 31, a counter-clockwise torsional moment about an operation shaft of the recliner 42 is generated. In this way, a large compressive load in the upper and lower direction is applied to the front arm portion 41a3 of the outer arm 41a and the front arm portion 41b3 of the inner arm 41b. Further, the ridge 41a32 is deformed so as to protrude toward the right and becomes a post-deformation ridge 41a320. The ridge 41b32 is deformed so as to protrude toward. the left and becomes a post-deformation ridge 41b320. Along with this, the gap S1 is enlarged and becomes a post-deformation gap S10. Energy is absorbed by the buckling of the front arm portion 41a3 and the front arm portion 41b3. At this time, since the front arm portion 41a3 and the front arm portion 41b3 are buckled so as to be separated from each other between the rivet R and the front bolt B, a force trying to fail the lower arm 41 in the left and right direction is canceled and the lower arm 42 is difficult to fall down in the left and right direction. In this way, it is possible to suppress the failing in the left and right direction of the lower arm 41 with a simple structure at the time of the front collision of the automobile. Meanwhile, the above operational effects are the same for the left side frame 32 and the left connection member 40.

As shown in FIG. 5, in the present embodiment, the ridge 41a42 and the ridge 41b42 are also fanned in the rear arm portion 41a4 and the rear arm portion 41b4, respectively, in this way, even when a large bending load is applied from the right side frame 31 via the recliner 42 at the time of the rear collision of the automobile, the energy is absorbed and time falling in the left and right direction of the lower arm 41 is suppressed. That is, in FIG. 5, when a large rearward pressing load is applied to the right side frame 31, a clockwise torsional moment about the operation shaft of the recliner 42 is generated. In this way, a large pressing load in the upper and lower direction is applied to the rear arm portion 41a4 of the outer arm 41a and the pear arm portion 41b4 of the inner arm 41b. Further, the ridge 41a42 is deformed so as to protrude toward the right, and the ridge 41b42 is deformed so as to protrude toward the left. Along with this, the gap S2 is enlarged and energy is absorbed by the buckling of the rear arm portion 41a4 and the rear arm portion 41b4. At this time, since the rear arm portion 41a4 and the rear arm portion 41b4 are buckled so as to be separated from each other between the rivet R and the rear bolt B, a force trying to fall the lower arm 41 in the left and right direction is canceled and the lower arm 42 is difficult to fall down in the left and right direction. In this way, it is possible to suppress the falling in the left and right direction of the lower arm 41 with a simple structure even at the time of the rear collision of the automobile. Meanwhile, since Lie torsional moment generated at the time of the rear collision of the automobile is smaller than the torsional moment generated at the time of the front collision of the automobile, the lengths in the front and rear direction of the rear arm portion 41a4 and the rear arm portion 41b4 is set to be smaller than those of the front arm portion 41a3 and the front arm portion 41b3. The above operational effects are the same for the left side frame 32 and the left connection member 40.

Although specific embodiments have been described above, the disclosure is not limited to the appearances and configurations in these embodiments, and various modifications, additions and deletions can be made without changing the spirit of the disclosure. For example, the following configurations can be adopted.

1. In the above embodiment, the inner arm 41b is Formed in a substantially U shape opened upward as seen from the seat width direction. However, the disclosure is not limited thereto. For example, the inner arm 41b may be formed in the same shape as the outer arm 41a, and the recliner 42 may also be connected to the inner arm 41b.

Figure 7:
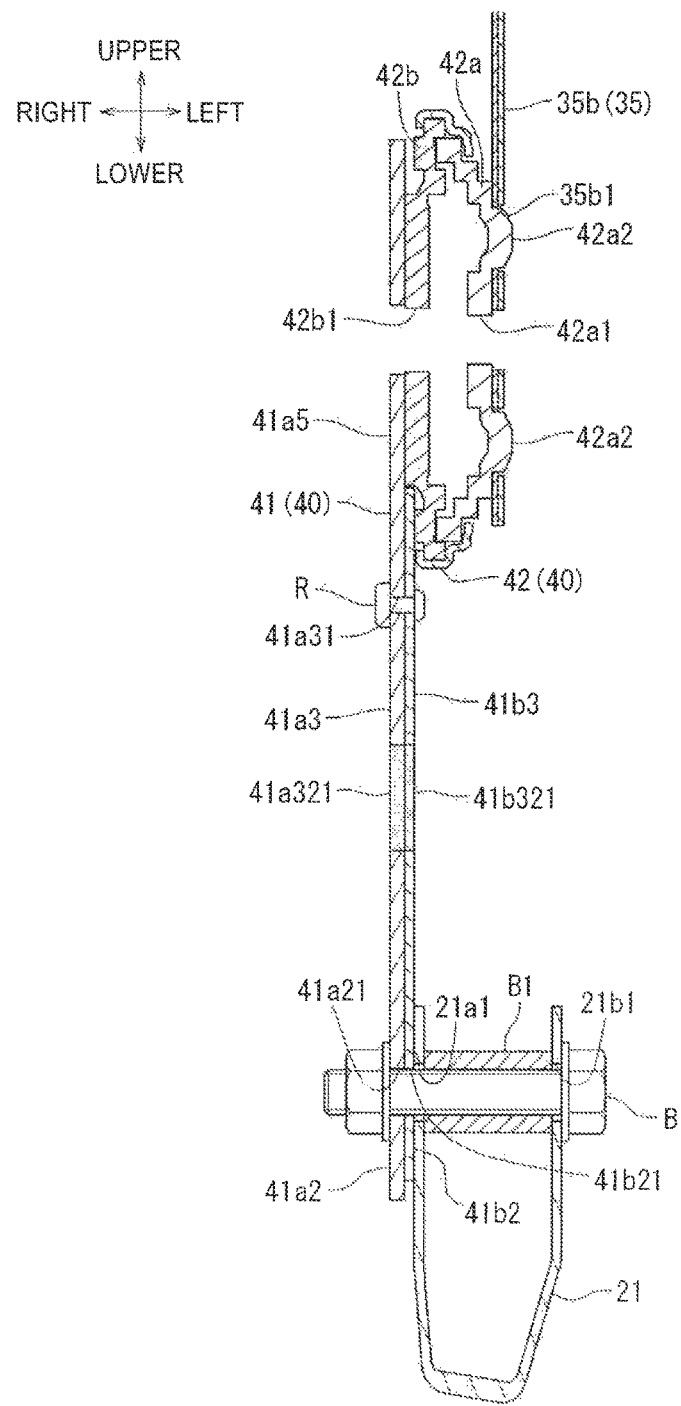
FIG. 7 is a view corresponding to FIG. 4, showing another embodiment of the disclosure.

2. In the above embodiment, the ridge 41a32 and the ridge 41b32 are adopted as the deformation promoting portion. However, the disclosure is not limited thereto. As another embodiment, as shown in FIG. 7, the portions in the vicinity of the middle of the front arm portion 41a3 and the front arm portion 41b3 may be configured as a soft portion 41a321 and a soft portion 41b321, which are softer than other portions. Specifically, different hardness nay be provided by quenching the portions of the front arm portion 41a3 and the from arm portion 41b3 other than the soft portion 41a321 and the soft portion 41b321. Since the soft portion 41a321 and the soil portion 41b321 are liable to be deformed in in directions away from each other when a compressive load in the upper and lower direction is applied, the same operational effects as those of the above embodiment can be obtained. Further, the above embodiment and another embodiment may be combined. That is, quenching may be performed on the portions other than the ridge 41a32 and the ridge 41b32. Meanwhile, the same is also applied to the rear arm portion 41a4 and the rear arm portion 41b4. Here, the soft portion 41a321 and the soft portion 41b321 correspond to the "deformation promoting portion" in the claims, respectively.

Figure 8:
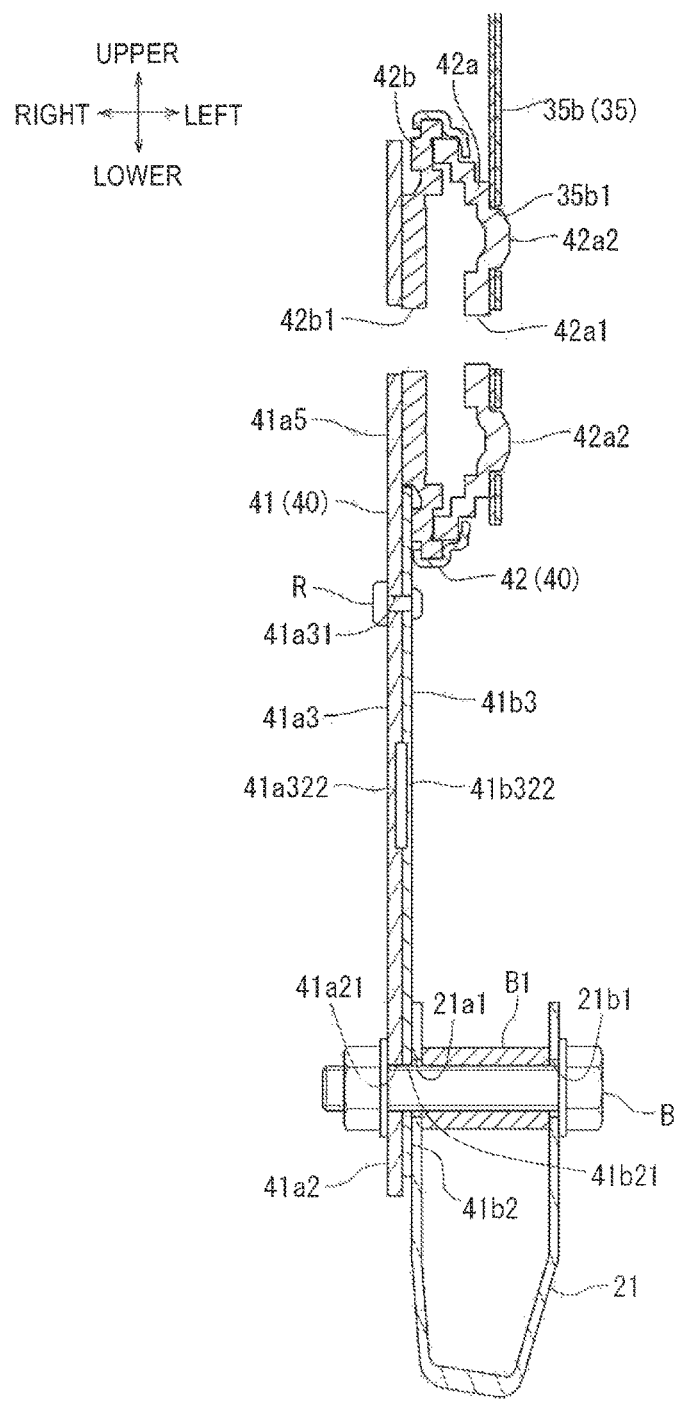
FIG. 8 is a view corresponding to FIG. 4, showing another embodiment of the disclosure.

3. In the above embodiment, the ridge 41a32 and the ridge 41b32 are adopted as the deformation promoting portion. However, the disclosure is not limited thereto. As still another embodiment, as shown in FIG. 8, the portions in the vicinity of the central portions of the front arm portion 41a3 and the front arm portion 41b3 may be configured as a thin-walled portion 41a322 and a thin-walled portion 41b322, which are thinner than other portions. Since the thin-walled portion 41a322 and the thin-walled portion 41b322 are liable to be deformed in directions away born each other when a compressive load in the upper and lower direction is applied, the same operational effects as those of the above embodiment can be obtained. Further, the above embodiment and still another embodiment may be combined. That is, the ridge 41a32 and the ridge 41b32 may be formed to be thinner. Meanwhile, the same is also applied to the rear arm portion 41a4 and the rear arm portion 41b4. Here, the thin-walled portion 41a322 and the thin-walled portion 41b322 correspond to the "deformation promoting portion" in the claims, respectively.

4. In the above embodiment, the lower arm 41 is attached to the rear portion of the cushion frame 20. However, the disclosure is not limited thereto. For example, the lower arm 41 may be attached to a floor of an automobile.

5. In the above embodiment, the back frame 30 is attached to the lower arm 41 via the recliner 42. However, the disclosure is not limited thereto. For example, the back frame 30 may be directly attached to the lower arm 41.

6. In the above embodiment, the outer arm 41a and the inner arm 41b are configured as members having the same overall thickness. However, the disclosure is not limited thereto. For example, the front arm portion 41a3 of the outer arm 41a may be made thicker than the rear arm portion 41a4, and the arm portion 41b3 of tile inner aria 41b may be made thicker than the rear arm portion 41b4. In this way, it is possible obtain the operational effects which is similar to the operational effects obtained when the length in the front and rear direction of the front arm portion 41a3 is longer than that of the rear arm portion 41a4 and that the length in the front and rear direction the of the front arm portion 41b3 is longer than that oldie rear arm portion 41b4.

Figure 9:
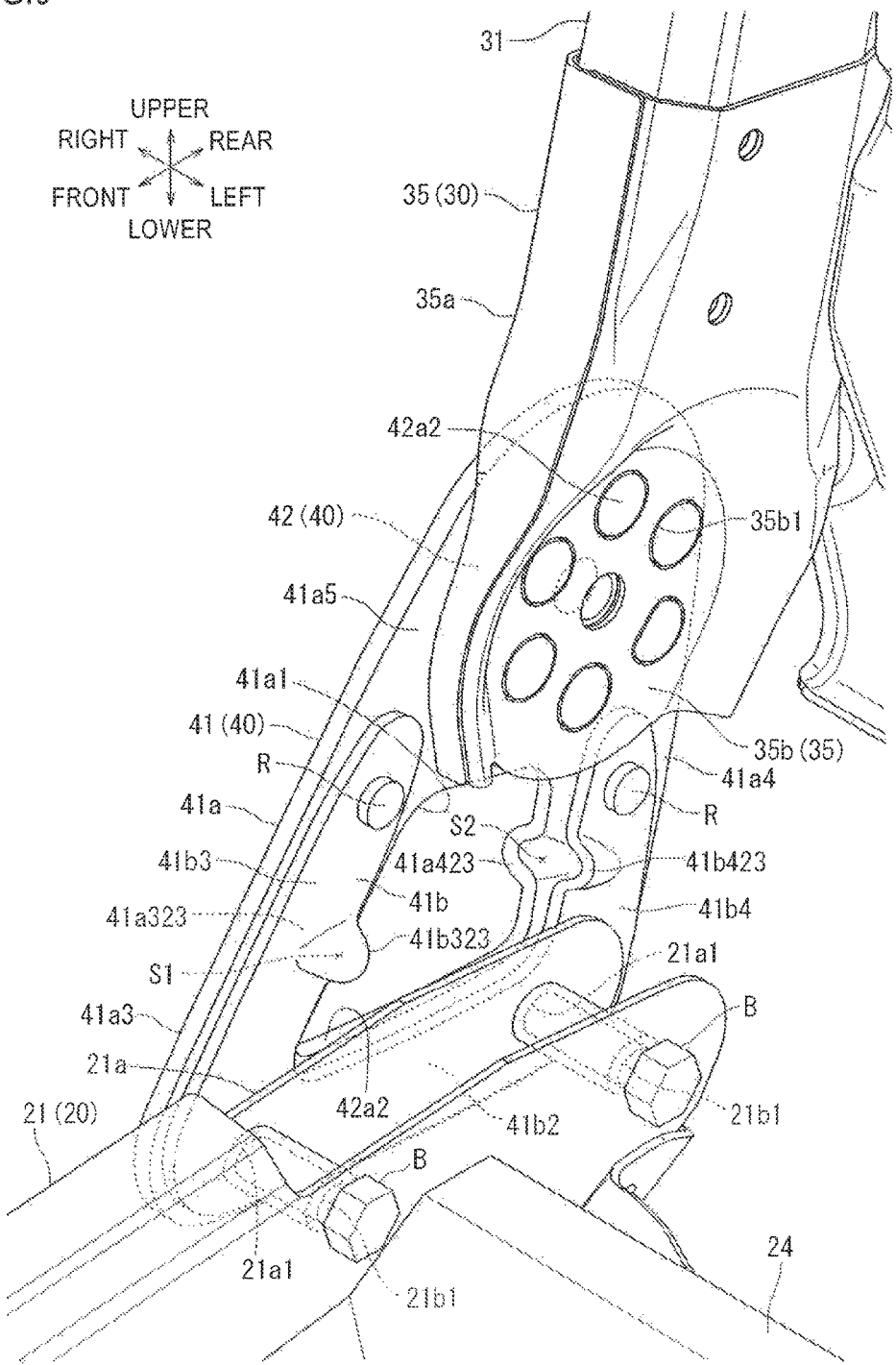
FIG. 9 is a corresponding to FIG. 2, showing another embodiment of the disclosure.

7. In the above embodiment, the ridge 41a32 of the outer arm 41a and the ridge 41b32 of the inner arm 41b are configured to extend over the entire region in the front and rear direction of the front arm portion 41a3 and the front arm portion 41b3. However, the disclosure is not limited thereto. For example, as shown in FIG. 9. a short ridge 41a323 and a short ridge 41b323 may be banned only on the side of the through-hole 41a1. The same is also applied to the rear arm portion 41a4 and the rear arm portion 41b4. In this way, in a case where a compressive load is applied to the front arm portion 41a3 and the front arm portion 41b3 or the rear arm portion 41a4 and the rear arm portion 41b4, the lower arm 41 is not deformed until the compressive load reaches a predetermined load, and the lower arm 41 is deformed to absorb energy when the compressive load exceeds the predetermined load. Meanwhile, the short ridge 41a323 and the short ridge 41b323 may be provided on the side opposite to the through-hole 41a1. Here, the short ridge 41a323 and the short ridge 41b323 correspond to the "deformation promoting portion" in the claims, respectively.

8. In the above embodiment, the disclosure is applied to a seat frame of an automobile seat. However, the disclosure may be applied to a back frame of a seat mounted on an airplane, a ship, a train, or the like.

The disclosure provides illustrative, non-limiting examples as follows:

According to a first aspect of the disclosure, there is provided a back frame attachment structure of attaching a back frame of a vehicle seat to a vehicle body side member, wherein the back frame includes a pair of side frames extending in an Upper and lower direction with a space in a seat width direction, wherein a lower end portion side of at least one of the pair of side frames is attached to an upper portion of a lower aim member whose lower portion is fixed to the vehicle body side member, wherein the lower arm member includes two plate-like members which are superimposed with each other in the seat width direction, the upper portion of the lower arm member and the lower portion of the lower arm member being connected to each other by a front connection portion located on a front side and a scar connection portion located on a rear side, and the front connection portion and the rear connection portion being separated by a through-hole located at a middle of the lower arm member when viewed from the seat width direction, and wherein, when a large load due to collision or the like of a vehicle is applied to the back frame, the two plate-like members are configured to absorb energy by being deformed to be separated from each other in the seat width direction by a compressive load in the upper and lower direction generated in the front connection portion or the rear connection portion.

According to the first aspect, when a large load due to collision or the like of the vehicle is applied to the hack frame, a strong compressive load in the upper and lower direction is generated in the rear connection portion at the time of rear collision and is generated in the front connection portion at the time of front collision. At this time, since the rear connection portion and the front connection portion are formed by superimposing the two plate-like members in the seat width direction, the two plate-like members are respectively buckled so as to be separated from each other in the seat width direction, thereby absorbing energy. In this way; the rear connection portion and the front connection portion are easily deformable in the upper and lower direction and are difficult to fall down in the seat width direction, so that the defog nation in the left and right direction of the lower arm member can be suppressed by a simple structure in either case of front collision or rear collision.

Accoding, to a second aspect of the disclosure, there is provided the back frame attachment structure according to the first aspect, wherein a deformation promoting portion configured to promote deformation of the two plate-like members in a direction separated from each other is provided in a vicinity of a middle, in the upper and lower direction of at least one of the front connection portion and the rear connection portion.

According to the second aspect, when a large load due to collision or the like of the vehicle is applied to the back frame, the two plate-like members of the front connection portion or the rear connection portion are deformed so as to be stably separated from each other in the seat width direction with the deformation starting from the deformation promoting portion. In this way, the deformation in the left and right direction of the lower arm member can be further suppressed.

According to a third aspect of the disclosure, there is provided the back frame attachment structure according to the second aspect, wherein the deformation promoting portion is a protruding portion protruding in the seat width direction so that the two plate-like, members are separated from each other.

According to the third aspect, the operational effect of the second aspect can be achieved by a simple structure in which the protruding portion is provided in the front connection portion or the rear connection portion of the two plate-like members.

According to a fourth aspect or the disclosure, there is provided the back frame attachment structure according to the second aspect, wherein each deformation promoting portion of each of the two plate-like members is at least one of thinner than and softer than other portions of each of the two plate-like members.

According to the fourth aspect, since each of the two plate-like members is formed in such a manner that the deformation promoting portion is at least one of thinner than and softer than the other portions of each of the two plate-like members, the operational effect of the second aspect can be stably achieved.

According to a fifth aspect of the disclosure, there is provided the back frame attachment structure according to any one of the first to fourth aspects, wherein a length in a front and rear direction of the front connection portion is longer than a length in the front and rear direction of the rear connection portion.

According to the fifth aspect, it is possible to more effectively absorb energy at the time of front collision where a stronger bending load is applied to the back frame.

According to a sixth aspect of the disclosure, there is provided the back frame attachment structure according to any one of the first to fifth aspects, wherein a length in the seat width direction of the front connection portion is longer than a length in the seat width direction of the rear connection portion.

According to the sixth aspect, it is possible to more effectively absorb energy at the time of front collision where a stronger bending load is applied to the back frame.

According to a seventh aspect of the disclosure, there is provided the back frame attachment structure according to any one of the first to sixth aspects, wherein the pair of side frames is tiltably attached to the vehicle body side member, and wherein the lower end portion side of the at least one of the pair of side frames is attached to the upper portion of the lower arm member via a recliner.

According to the seventh aspect, in a vehicle seat in which an inclination angle of the back frame to the vehicle body side member can be changed via the recliner, it is possible to absorb energy by suppressing the deformation in the seat width direction of the lower arm member when a large load due to collision or the like of a vehicle is applied to the back frame.

According to an eighth aspect of the disclosure, there is provided the back frame attachment structure according to the seventh aspect, wherein the recliner is fixed to only one of the two plate-like members at the upper portion of the lower arm member, and wherein another of the two plate-like members is connected to the one of the two plate-like members in a vicinity of the lower end portion of the recliner.

According to the eighth aspect, the recliner having high strength and high rigidity is attached to only one of the two plate-like members of the lower arm member. In this way, an area in which. the two plate-like members are superimposed can be reduced, so that the weight of the vehicle seat can be reduced.

According to a ninth aspect of the disclosure, there is provided a vehicle seat including a back frame including a pair of side frames extending hi an upper and lower direction with a space in a seat width direction; a lower arm member including two plate-like members which are superimposed with each other in the seat width direction, an upper portion of the lower arm member being connected to at least one of the pair of side frames; and a cushion frame to which a lower portion of the lower arm member is fixed, wherein the upper portion of the lower arm member and the lower portion of the lower arm member are connected to each other by a front connection portion located on a front side and a rear connection portion located on a rear side, the front connection portion and the rear connection portion being separated by a through-hole located therebetween, and wherein at least one of the front connection portion and the rear connection portion includes a deformation promoting portion configured to promote deformation of the two plate-like members in a direction separated from each other.

What is claimed is:

1. A back frame attachment structure of attaching a back frame of a vehicle seat to a cushion frame,
   wherein the back frame includes a pair of side frames extending in an upper and lower direction with a space in a seat width direction,
   wherein a lower end portion side of at least one of the pair of side frames is attached to an upper portion of a lower arm member whose lower portion is fixed to the cushion frame,
   wherein the lower arm member includes two plate-like members which are superimposed with each other in the seat width direction, the upper portion of the lower arm member and the lower portion of the lower arm member being connected to each other by a front connection portion located on a front side and a rear connection portion located on a rear side, and the front connection portion and the rear connection portion being separated by a through-hole located at a middle of the lower arm member when viewed from the seat width direction, and
   wherein, when a load due to collision is applied to the back frame, the two plate-like members are configured to absorb energy by being deformed to be separated from each other in the seat width direction by a compressive load in the upper and lower direction generated in the front connection portion or the rear connection portion.

2. The back frame attachment structure according to claim 1,
   wherein a deformation promoting portion configured to promote deformation of the two plate-like members ci a direction separated from each other is provided in a vicinity of a middle, in the upper and lower direction, of at least one of the front connection portion and the rear connection portion.

3. The back frame attachment structure according to claim 2,
   wherein the deformation promoting portion is a protruding portion protruding in the seat width direction so that the two plate-like members are separated from each other.

4. The back frame attachment structure according to claim 2,
   wherein each deformation promoting portion of each ci the two plate-like members is at least one of thinner than and softer than other portions of each of the two plate-like members.

5. The back frame attachment structure according to claim 1,
   wherein a length in a front and rear direction of the front connection portion is longer than a length in the front and rear direction of the rear connection portion.

6. The back frame attachment structure according to claim 1,
   wherein a length in the seat width direction of the front connection portion is longer than a length in the seat width direction of the rear connection portion.

7. The back frame attachment structure according to claim 1,
   wherein the pair of side frames is tiltably attached to the vehicle body side member, and
   wherein the lower end portion side of the at least one of the pair of side frames is attached to the upper portion of the lower arm member via a recliner.

8. The back frame attachment structure according to claim 7,
   wherein the recliner is fixed to only one of the two plate-like members at the upper portion of the lower arm member, and
   wherein another of the two plate-like members is connected to the one of the two plate-like members in a vicinity of the lower end portion of the recliner.

9. A vehicle seat comprising:
   a back frame including a pair of side frames extending in an upper and lower direction with a space in a seat width direction;
   a lower inn member including two plate-like members which are superimposed with each other in the seat width direction, an upper portion of the lower arm member being connected to at least one of the pair of side frames; and
   a cushion frame to which a lower portion of the lower arm member is fixed,
   wherein the upper portion of the lower arm member and the lower portion of the lower arm member are connected to each other by a front connection portion located on a front side and a rear connection portion located on a rear side, the front connection portion and the rear connection portion being separated by a through-hole located therebetween, and
   wherein at least one of the front connection portion and the rear connection portion includes a deformation promoting portion configured to promote deformation of the two plate-like members in a direction separated from each other.

* * * * *